US012031716B2

(12) United States Patent
McIntosh

(10) Patent No.: US 12,031,716 B2
(45) Date of Patent: Jul. 9, 2024

(54) SOLAR LIGHT SHADE

(71) Applicant: Mary Ann McIntosh, Springboro, OH (US)

(72) Inventor: Mary Ann McIntosh, Springboro, OH (US)

(*) Notice: Subject to any disclaimer, the term of this patent is extended or adjusted under 35 U.S.C. 154(b) by 0 days.

(21) Appl. No.: 17/861,310

(22) Filed: Jul. 11, 2022

(65) Prior Publication Data
US 2023/0026996 A1    Jan. 26, 2023

Related U.S. Application Data

(60) Provisional application No. 63/223,276, filed on Jul. 19, 2021.

(51) Int. Cl.
*F21V 9/40* (2018.01)
*F21V 1/10* (2006.01)
*F21V 1/12* (2006.01)
*F21V 1/14* (2006.01)

(52) U.S. Cl.
CPC ............... *F21V 9/40* (2018.02); *F21V 1/10* (2013.01); *F21V 1/12* (2013.01); *F21V 1/146* (2013.01)

(58) Field of Classification Search
CPC ..... F21V 9/40; F21V 1/10; F21V 1/14; F21V 1/146; F21V 1/22; F21V 1/00; F21V 1/12
USPC ................ 362/361, 356, 355, 351, 353, 192
See application file for complete search history.

(56) References Cited

U.S. PATENT DOCUMENTS

| | | | | |
|---|---|---|---|---|
| 2,264,255 A | * | 11/1941 | Burke | F21V 1/00 362/358 |
| 7,073,919 B1 | * | 7/2006 | Masina | F21S 9/037 362/153.1 |
| 2008/0175006 A1 | * | 7/2008 | Kellmann | F21V 3/023 362/363 |

* cited by examiner

*Primary Examiner* — Laura K Tso
(74) *Attorney, Agent, or Firm* — Boudwin Intellectual Property Law, LLC; Daniel Boudwin

(57) ABSTRACT

A solar light shade includes a housing having an annular sidewall, wherein the annular sidewall includes an upper end opposite a lower end. A lip extends radially inwardly from the upper end towards a longitudinal axis of the housing defining an opening through the upper end. A diameter of the opening is less than a diameter of the lower end. The housing removably secures over a solar light fixture, such that a solar panel of the solar light fixture is exposed by the opening. The housing is a translucent material designed to filter light therethrough, such that light emitted from the solar light fixture is altered to a different color or intensity.

8 Claims, 3 Drawing Sheets

SOLAR LIGHT SHADE

CROSS REFERENCE TO RELATED APPLICATIONS

This application claims the benefit of U.S. Provisional Application No. 63/223,276 filed on Jul. 19, 2021. The above identified patent application is herein incorporated by reference in its entirety to provide continuity of disclosure.

BACKGROUND OF THE INVENTION

The present invention relates to light shades. More particularly, the present invention pertains to a light shade having an opening therethrough to expose a solar panel of an outdoor solar light, such that the user can selectively adjust the appearance and light emitted from an outdoor solar light.

Many individuals enjoy spending time outdoors and decorating their yards in a particular way, however visibility outdoors in the evening can make such outdoor activities dangerous or outdoor decorations difficult to see. Failure to properly illuminate the area could lead to individuals tripping, falling, or being unable to identify a potential threat, such as a wild animal, wasp's nest, or the like, all of which can pose a risk of injury. However, traditional outdoor lighting options may not be desirable for the user, as they often utilize harsh white light or otherwise are of a style that does not suit an individual's particular tastes. White light may fail to enhance the aesthetics of an individual's home, or otherwise negatively highlight aspects of the home the individual wishes to draw attention away from. Providing homeowners with an alternative means to customize the appearance of outdoor lighting, both in terms of external appearance and the color and intensity of light emitted from the outdoor lighting, can enhance the homeowner's perception of their home. Typically, users can select a particular lighting fixture design or purchase individually colored lights, however, such options are costly and can be difficult to adjust in the future should the homeowner's tastes change. Additionally, as most outdoor lights utilize solar power to automatically illuminate during low-light conditions, alternative means of altering the external appearance of outdoor lighting can occlude the solar panel, preventing the outdoor lighting from operating in a desired manner. Therefore, a device that can selectively cover an outdoor lighting fixture to change the external appearance of the outdoor lighting, adjust the color and intensity of light emitted from the outdoor lighting, while also leaving the solar panel of the outdoor lighting exposed so as to not interfere with operation of the outdoor lighting is desired.

In light of the devices disclosed in the known art, it is submitted that the present invention substantially diverges in design elements from the known art and consequently it is clear that there is a need in the art for an improvement to existing light shades. In this regard, the instant invention substantially fulfills these needs.

SUMMARY OF THE INVENTION

In view of the foregoing disadvantages inherent in the known types of light shades now present in the known art, the present invention provides a solar light shade wherein the same can be utilized for providing convenience for the user when altering the appearance and light qualities of a solar powered outdoor light fixture, while not interfering with the operation thereof.

The present system comprises a housing comprising an annular sidewall having an upper end opposite a lower end. A lip extends radially inwardly from the upper end towards a longitudinal axis of the housing defining an opening through the upper end, wherein a diameter of the opening is less than a diameter of the lower end. The housing is configured to removably secure over a solar light fixture, such that a solar panel of the solar light fixture is exposed by the opening. The housing further comprises a translucent material configured to filter light therethrough. In some embodiments, the upper end and the lower end are disposed along parallel planes. In another embodiment, an interior surface of the annular sidewall comprises a smooth and continuous surface. In other embodiments, a central portion of the annular sidewall tapers radially inwardly towards the longitudinal axis of the housing to define a smaller diameter than each of the upper end and the lower end. In yet another embodiment, a diameter of the central portion is less than a diameter of a head of the solar light fixture, such that the housing frictionally engages the solar light fixture. In some embodiments, the lower end tapers radially outwardly from the longitudinal axis of the housing to define a larger diameter than the upper end. In another embodiment, the housing comprises a flexible material configured to expand radially outwardly from the longitudinal axis, such that the housing frictionally engages the solar light fixture. In other embodiments, the upper end comprises a rounded exterior surface. In yet another embodiment, the lip comprises a planar member. In some embodiments, the lip rests flush against an upper surface of the solar light fixture when the housing is removably secured thereto. In another embodiment, a height of the housing is equivalent to a height of the solar light fixture, such that the lower end rests flush against a ground surface when the housing is removably secured to the solar light fixture. In other embodiments, the translucent material comprises pigmentation configured to alter a color of light emitted from the solar light fixture. In yet another embodiment, the translucent material is configured to reduce the intensity of light emitted from the solar light fixture. In some embodiments, an entirety of the annular sidewall comprises the translucent material.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
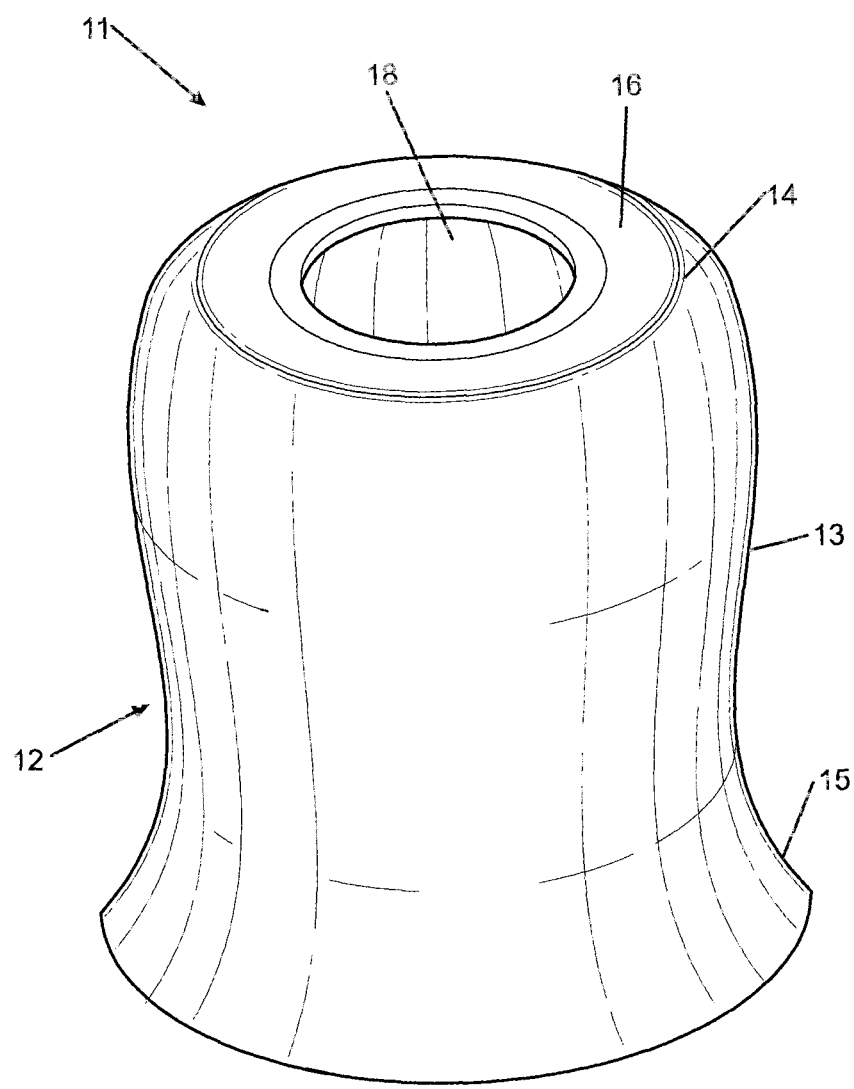
FIG. 1 shows a perspective view of an embodiment of the solar light shade.

Reference is made herein to the attached drawings. Like reference numerals are used throughout the drawings to depict like or similar elements of the solar light shade. The figures are intended for representative purposes only and should not be considered to be limiting in any respect.

Figure 2:
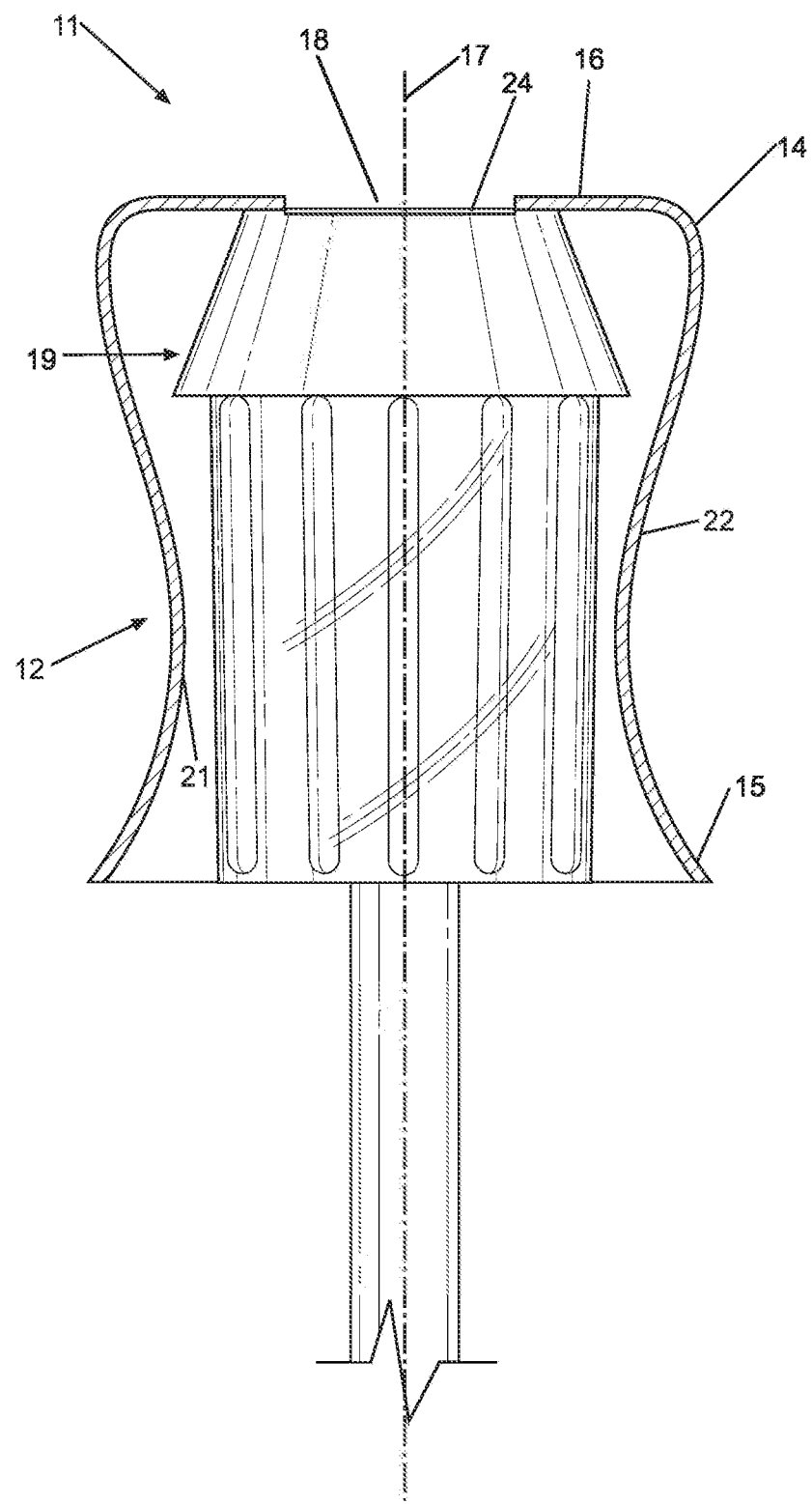
FIG. 2 shows a cross-sectional view of an embodiment of the solar light shade disposed over a solar light fixture.

Referring now to FIG. 1, there is shown a perspective view of an embodiment of the solar light shade. The solar light shade 11 comprises a housing 12 having an annular sidewall 13, wherein the annular sidewall 13 includes an upper end 14 opposite a lower end 15. The housing 12 is configured to removably secure over an existing solar light fixture (as shown in FIG. 2, 19), such that the housing 12 alters the exterior appearance of the solar light fixture when secured thereto. The housing 12 further comprises a lip 16 extending radially inwardly from the upper end 14 and towards a longitudinal axis of the housing 12, wherein the lip 16 is configured to rest on an upper surface of the solar light fixture to retain the housing 12 thereon. The lip 16 extends partially into an interior of the housing 12 defining an opening 18 through the upper end 14. In this manner, the opening 18 provides exposure to a solar panel disposed on the solar light fixture, allowing the solar light fixture to operate unimpeded when the housing 12 is secured thereto. In the illustrated embodiment, the lower end 15 of the annular sidewall 13 flares radially outwardly from the longitudinal axis of the housing 12, such that the lower end 15 defines a larger diameter than the upper end 14. In this manner, the larger diameter of the lower end 15 facilitates placement of the housing 12 over an existing solar light fixture as the lower end 15 can be seated around the head of a solar light fixture quickly and efficiently. In the illustrated embodiment, the lip 16 and the lower end 15 are disposed along parallel planes, such that the housing 12 is maintained in a substantially coaxial alignment with the solar light fixture when secured thereto.

The housing 12 comprises a translucent material, such that light emitted from the solar light fixture is filtered through the housing 12. In one embodiment, the housing 12 comprises a polypropylene material, wherein the degree of translucency is controlled by a thickness of the annular sidewall 13. For example, in one embodiment, the annular sidewall 13 is contemplated to comprise a thickness of 1/32 inches to reduce the opacity of the material. In some embodiments, the housing 12 further comprises a pigmentation therein, such that a color of the light emitted from the solar light fixture is altered by the translucent material. Similarly, the translucent material can be configured to reduce the intensity of the light emitted from the solar light fixture to provide a desired aesthetic appeal to a surrounding area, such as by producing softer illumination. Materials having varying degrees of translucency are contemplated, such that the user can reduce the amount of light filtered through the housing 12 to suit a desired outdoor lighting scheme. In some embodiments, an entirety of the annular sidewall 13 is translucent, whereas, in alternate embodiments, only a portion of the annular sidewall 13 is translucent, such as a lower portion disposed adjacent to a light source of the solar light fixture, one side of the annular sidewall 13, or a portion of the annular sidewall 13 in a specific shape or pattern. In this manner, the user can ensure that the solar light shade 11 replicates the illumination of an existing solar light fixture, limits illumination to a particular direction, or provides illumination in a desired shape or pattern, respectively.

Figure 3:
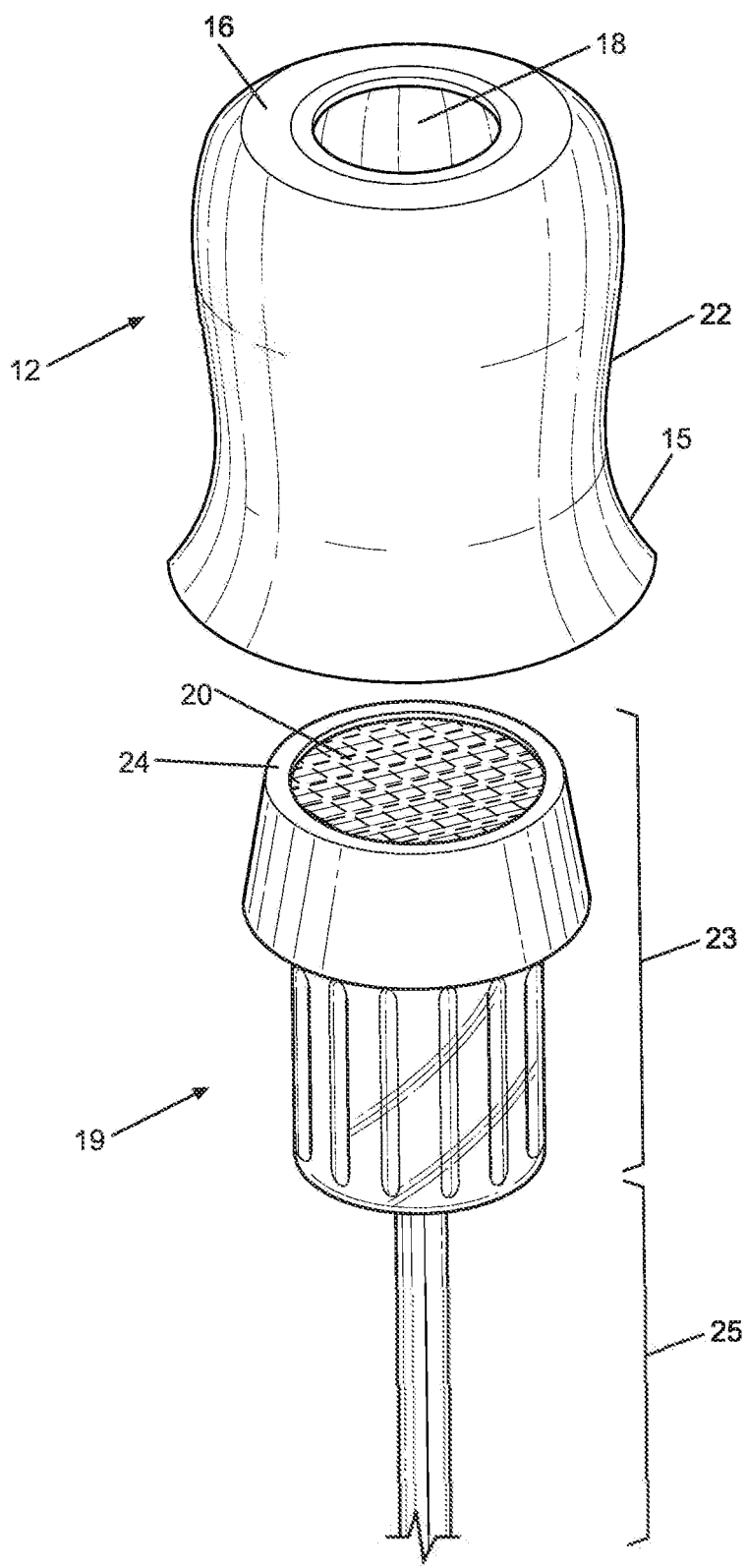
FIG. 3 shows an exploded view of an embodiment of the solar light shade being affixed to a solar light fixture.

Referring now to FIG. 2, there is shown a cross-sectional view of an embodiment of the solar light shade disposed over a solar light fixture. In the illustrated embodiment, the solar light shade 11 is shown affixed to an existing solar light fixture 19, wherein the housing 12 comprises a substantially bell-shaped form factor; wherein the side wall of the upper end is concave relative to the longitudinal axis and wherein the upper end is at an acute angle relative to the longitudinal axis. Particularly, in the shown embodiment, a central portion 22 of the housing 12 tapers radially inwardly towards a longitudinal axis 17 of the housing 12, such that a diameter of the central portion 22 comprises a diameter less than each of the upper end 14 and the lower end 15. In some embodiments, the diameter of the central portion 22 is contemplated to be within a close tolerance to a diameter of the solar light fixture 19, such that the housing 12 frictionally engages the solar light fixture 19 when removably secured thereto. Alternatively, in some embodiments, the housing 12 comprises an elastic material, such that the housing 12 can expand radially outwardly from the longitudinal axis 17 to secure over solar light fixtures 19 having a larger diameter than the central portion 22. In such embodiments, once secured over the solar light fixture 19, the housing 12 would then contract about the solar light fixture 19, removably securing the housing 12 thereto. In the shown embodiment, the upper end 14 curves radially inwardly towards the longitudinal axis 17 to define a diameter less than that of the lower end 15, but greater than that of the central portion 22, such that the upper end 14 defines a rounded exterior surface. In some embodiments, the upper end 14 comprises a diameter of 2⅛ inches. Similarly, in the illustrated embodiment, the lower end 15 flares radially outwardly to define a diameter greater than each of the central portion 22 and the upper end 14, wherein the lower end 15 provides an enlarged opening to place the solar light fixture 19 through. The lip 16 comprises a planar member extending from the upper end 14, and rests flush against an upper surface 24 of the solar light fixture 19 to retain the housing 12 over a head (as shown in FIG. 3, 23) of the solar light fixture 19. The opening 18 is disposed over a solar panel (as shown in FIG. 3, 20) of the solar light fixture 19, such that the housing 12 does not occlude the solar panel or otherwise interfere with the standard operation of the solar light fixture 19. In some embodiments, the opening 18 comprises a diameter of 1¼ inches. In the illustrated embodiment, an interior surface 21 of the housing 12 comprises a smooth and continuous surface to prevent snagging or other undesired contact with the solar light fixture 19. In some embodiments, a height of the housing 12 is equivalent to a height of the solar light fixture 19, such that the lower end 15 rests flush with a ground surface. In this manner, the housing 12 encapsulates an entirety of the solar light fixture 19, such that the solar light shade 11 disguises the solar light fixture 19.

Referring now to FIG. 3, there is shown an exploded view of an embodiment of the solar light shade being affixed to a solar light fixture. In the shown embodiment, the solar light shade is contemplated for use with a variety of existing solar light fixtures 19, however, in other embodiments, the solar light shade is dimensioned for use with a particular solar light fixture 19 that may be included as part of a kit, wherein such embodiments, the lip 16 and the opening 18 are dimensioned to correspond directly to a size of the solar panel 20 disposed on the upper surface 24 of the solar light fixture 19. In such embodiments, the solar light fixture 19 comprises a planar upper surface 24 upon which the lip 16 rests flush when the housing 12 is secured thereto. In one use, the head 23 of the solar light fixture 19 is inserted through the lower end 15 of the housing 12. The central portion 22 then frictionally engages the head 23 to retain the housing 12 thereon. Furthermore, the lip 16 rests flush against the upper surface 24 of the solar light fixture 19, such that the solar panel 20 is exposed via the opening 18, thereby allowing the solar light fixture 19 to operate in a traditional manner. In some embodiments, the housing 12 extends along a height of the head 23, such that the lower end 15 terminates before a stem 25 of the solar light fixture 19. Once affixed to the head 23 of the solar light fixture 19, the housing 12 filters light emitted from the solar light fixture 19 to alter the appearance of light emitted by the solar light fixture 19. In some embodiments, the housing 12 alters the color of the light emitted by the solar light fixture 19, the intensity of the light emitted by the solar light fixture 19, the pattern of light emitted by the solar light fixture 19, or any combination thereof. In this manner, the solar light shade allows a user to personalize an outdoor area to their aesthetic preferences, while also ensuring proper operation of typical outdoor solar light fixtures.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar light shade, consisting of:
a housing consisting of an annular sidewall having an upper end opposite a lower end with a central portion in between the upper end and the lower end;
wherein a lip extends radially inwardly from the upper end towards a longitudinal axis of the housing defining an opening through the upper end;
wherein the upper end and the lower end are disposed along parallel planes;
wherein a diameter of the opening is less than a diameter of the lower end;
wherein the housing is configured to removably secure over a solar light fixture, such that a solar panel of the solar light fixture is exposed by the opening;
wherein a diameter of the central portion is less than a diameter of the upper end of the solar light fixture;
wherein the housing consists of a flexible material configured to expand radially outwardly from the longitudinal axis, such that the housing frictionally engages the solar light fixture;
wherein a central portion of the annular sidewall tapers radially inwardly towards the longitudinal axis of the housing to define a smaller diameter than each of the upper end and the lower end;
wherein the lip consists of a planar member;
wherein a height of the housing is equivalent to a height of the solar light fixture;
wherein an entirety of the annular sidewall consists of a translucent material;
wherein the annular side wall of the upper end is concave relative to the longitudinal axis; and wherein the upper end is at an acute angle relative to the longitudinal axis.

2. The solar light shade of claim 1, wherein an interior surface of the annular sidewall consists of a smooth and continuous surface.

3. The solar light shade of claim 1, wherein the lower end flares radially outwardly from the longitudinal axis of the housing to define a larger diameter than the upper end.

4. The solar light shade of claim 1, wherein the upper end consists of a rounded exterior surface.

5. The solar light shade of claim 1, wherein the lip rests flush against an upper surface of the solar light fixture when the housing is removably secured thereto.

6. The solar light shade of claim 1, wherein the translucent material consists of pigmentation therein to alter a color of the light emitted from the solar light fixture.

7. The solar light shade of claim 1, wherein the translucent material is configured to reduce the intensity of the light emitted from the solar light fixture.

8. A solar light shade, consisting of:
a housing consisting of an annular sidewall having an upper end opposite a lower end with a central portion in between the upper end and the lower end;
wherein an interior surface of the annular sidewall consists of a smooth and continuous surface;
wherein a lip extends radially inwardly from the upper end towards a longitudinal axis of the housing defining an opening through the upper end;
wherein the upper end and the lower end are disposed along parallel planes;
wherein a diameter of the opening is less than a diameter of the lower end;
wherein the housing in configured to removably secure over a solar light fixture, such that a solar panel of the solar light fixture is exposed by the opening;
wherein the lower end flares radially outwardly from the longitudinal axis of the housing to define a larger diameter than the upper end;
wherein the upper end consists of a rounded exterior surface;
wherein a diameter of the central portion is less than a diameter of the upper end of the solar light fixture;
wherein the housing consists of a flexible material configured to expand radially outwardly from the longitudinal axis, such that the housing frictionally engages the solar light fixture;
wherein a central portion of the annular sidewall tapers radially inwardly towards the longitudinal axis of the housing to define a smaller diameter than each of the upper end and the lower end;
wherein the lip rests flush against an upper surface of the solar light fixture when the housing is removably secured thereto;
wherein the lip consists of a planar member;
wherein a height of the housing is equivalent to a height of the solar light fixture;
wherein an entirety of the annular sidewall consists of a translucent material;
wherein the translucent material consists of pigmentation therein to alter a color of the light emitted from the solar light fixture;
wherein the translucent material is configured to reduce the intensity of the light emitted from the solar light fixture;
wherein the annular side wall of the upper end is concave relative to the longitudinal axis; and
wherein the upper end is at an acute angle relative to the longitudinal axis.

* * * * *